United States Patent [19]
Lanzenberger

[11] 3,841,170
[45] Oct. 15, 1974

[54] MULTI-STEP TRANSMISSION WITH AN INDEXING DISK
[75] Inventor: Horst Lanzenberger, Munich, Germany
[73] Assignee: Friedrich Deckel Aktiengesellschaft, Munich, Germany
[22] Filed: Feb. 8, 1973
[21] Appl. No.: 330,640

[30] Foreign Application Priority Data
Feb. 11, 1972  Germany............................ 2206671

[52] U.S. Cl............................... 74/473 R, 74/337.5
[51] Int. Cl............................................. G05g 9/00
[58] Field of Search.... 74/473 R, 471 R, 335, 337.5

[56] References Cited
UNITED STATES PATENTS
2,986,950  6/1961  Gerber................................. 74/335
3,739,656  6/1973  Williams et al. .................. 74/473 R
FOREIGN PATENTS OR APPLICATIONS
1,625,182  7/1970  Germany ............................. 74/335

Primary Examiner—Samuel Scott
Assistant Examiner—F. D. Shoemaker
Attorney, Agent, or Firm—Woodhams, Blanchard and Flynn

[57] ABSTRACT

Shifting mechanism primarily for machine tools. In one preferred embodiment there is provided at least one pivotal lever for operating a shift rod and there is provided in said lever a pin receiving opening. A rotatable index plate is provided with a plurality of pins radially offset from each other but at a total difference of maximum and minimum radius not exceeding one-half the diameter of said opening. Guide and operating means are provided by which said index plate can be withdrawn, rotated to a desired location and returned to an engaging position whereby a selected one of said pins will be partially aligned with said opening and upon entry into said opening being urged will effect sufficient movement of said lever to effect the desired shift. Multiple pins and multiple levers can be arranged for effecting desired multiple shifts. Other embodiments can reverse the relative positions of the pins and the openings provided only the offset part is on the lever to effect movement thereof upon appropriate engagement of the selected pair of pins and openings.

12 Claims, 5 Drawing Figures

MULTI-STEP TRANSMISSION WITH AN INDEXING DISK

FIELD OF THE INVENTION

The invention relates to a multi-step transmission, for example, a spur gear transmission, particularly for machine tools, comprising one or more sliding gears, spline shafts, jaw clutches or the like, which are movable independently from one another, control levers connected thereto through transmission rods and including an indexing disk which is arranged with its axis of rotation perpendicularly to the pivot plane of the control levers and rotatable into various switching positions, and which indexing disk is coupled with the control levers for effecting shifting operations.

BACKGROUND OF THE INVENTION

Such transmissions usually permit a shifting through the various transmission steps while the transmission is at standstill or during a gradual stopping without load.

Transmissions of the type referred to above are already known, in which the control levers are guided through sliding members in grooves of the indexing disk. The grooves are constructed as so-called shifting curves so that the control levers during rotation of the indexing disk are moved successively into their shifting positions corresponding to the angular positions of the indexing disk. Such arrangements have the disadvantage that the forming of the shifting curves is limited because several shifting curves may not intersect one another and to correct this problem an unacceptably expensive system of shifting means for guiding the sliding members would have to be provided. A further disadvantage is that during rotation of the indexing disk through several shifting steps the control levers and the sliding gears connected therewith must assume one after the other all shifting positions lying therebetween.

To avoid the last-mentioned disadvantage a preselection transmission with several indexing disks is likewise already known, which indexing disks can for selecting the shifting position be uncoupled from the control levers, whereby only through the re-coupling of the indexing disks the actual shifting movement of the control levers is carried out (OS 1 625 182). The axes of the indexing disks lie approximately in or parallel to the pivot planes of the control levers. In order that during the axial engaging movement of the indexing disks a pivoting of the control levers into both pivotal directions is possible, these are constructed as double levers, whereby each lever end cooperates with an indexing disk. Both indexing disks must be coupled with one another in direction of rotation and in direction of movement. For an arrangement with two control levers corresponding to the example described hereinafter, such a device requires that the switching arrangement include two shafts coupled with one another by gear means and four indexing disks. Such an arrangement is very expensive to manufacture, install and requires much space.

SUMMARY OF THE INVENTION

The purpose of the present invention is thus to produce a transmission of the type mentioned above, namely, with an indexing disk which is arranged with its axis approximately perpendicularly to the pivot plane of the control levers, in which transmission there exists no limitation of the shifting curve shape and in which the control levers are pivoted as in a preselection transmission without going through the intermediate positions into their final shifted positions.

This purpose is attained according to the invention by arranging tripping pins on the indexing disk and centering cones on the control levers, which centering cones cooperate with said control levers, or vice versa, and by making the indexing disk axially movable between an engaged position and a disengaged position of the tripping pins, so that during engagement of the indexing disk in each shifted position each one tripping pin and centering cone associated with one control lever are centered with respect to one another. Thus, the centering movement associated with the control lever effects the shifting movement.

For selecting the correct shifted position, the indexing disk is disengaged through axial shifting of the control levers by pulling the tripping pins from the centering cones. During engagement of the indexing disk there is a meeting between each pair of tripping pin and centering cone associated with one control lever. If the tripping pin is already centered with respect to the associated centering cone, it remains in this position, namely, the corresponding sliding gear is already in the position corresponding to this shifting step. If, however, a tripping pin and centering cone are offset laterally with respect to one another, then the first one is caught by the latter and is centered. This centering movement is always associated with the part which is connected to the control lever.

The pivotal plane of the control levers is approximately parallel to the plane of the indexing disk so that the device in the direction of the indexing disk axis remains short. The control levers are no longer guided alongside shifting curves but their position is determined only during the engaging operation by the relative position of a tripping pin to a centering cone. The shifting curves according to the state of the art are in effect replaced by individual shifting points so that the problem of the intersection of shifting curves no longer exists. During a stepping of the indexing disk over several shifting steps the disengaged control levers are not carried therewith but they are at all times only slightly displaced from the desired shifting position and hence can be very quickly moved into same. Compared with the known preselection transmission the additional advantage is thus obtained in that for several, such as two, control levers only one indexing disk is required which can adjust one-arm control levers in both possible directions of pivotal movement.

The invention includes the possibility that several tripping pins cooperate with one centering cone or that several centering cones cooperate with one tripping pin. Furthermore, arrangements are conceivable in which several tripping pins cooperate with several centering cones.

The invention furthermore provides that the tripping pins are arranged on the indexing disk and the centering cones on the control levers or vice versa. The relative centering movement is always associated with the part which is arranged on the control lever.

According to a further characteristic of the invention, the indexing disk is connected to a manually operated selector disk for the rotating, and for engaging or disengaging, movement and is axially movable against the force of a spring for disengaging. In this manner the shifting operation can take place manually in the simplest manner. The selector disk which in a conventional manner may be provided with a marking indicating the shifting steps is pulled out against the force of the spring, the new shifted position is chosen without the necessity of overcoming shifting forces, and then the selector disk is engaged, moved in with the assistance of the spring. A simple operation is thereby assisted by applying the shifting force by a pressing movement.

A further simplification is obtained if according to the invention the indexing disk, particularly the selector disk connected therewith, is connected, if desired, through a compound lever arrangement and a freewheel locking mechanism to at least one of the gears in such a manner that this starts to rotate during the engaging movement. This assures that during engagement of two gears, one tooth does not abut another tooth to block the shifting movement. Most advantageously the driven gears are those which have a small mass applied at their axes and are arranged to mate with as many other gears as possible.

Several exemplary embodiments of the invention are illustrated in the drawings and will be described more in detail hereinafter.

DETAILED DESCRIPTION

Figure 1:
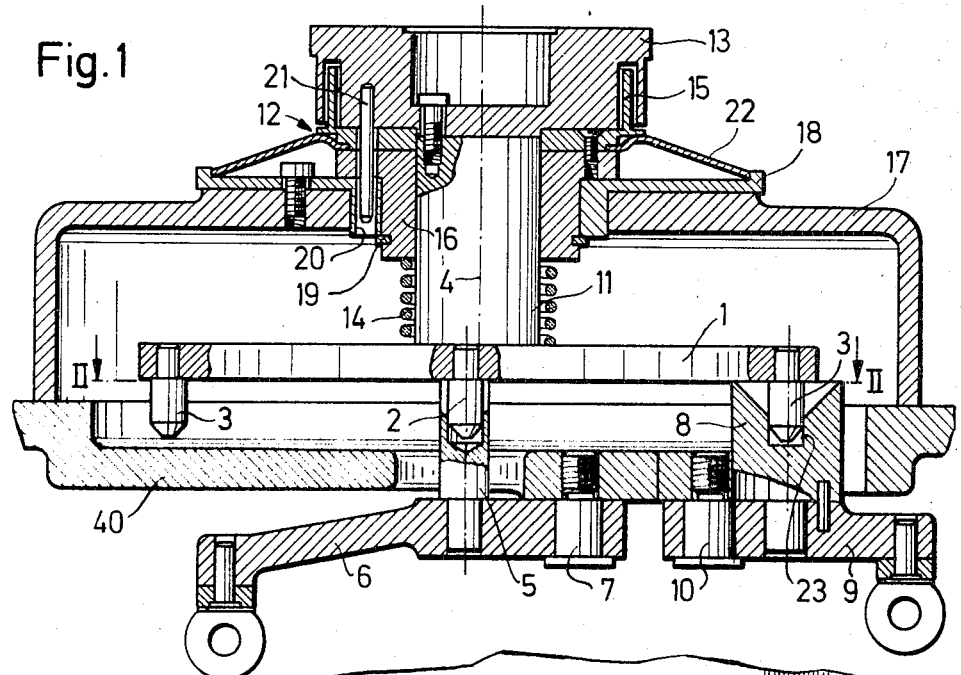
FIG. 1 is a longitudinal cross-sectional view of an exemplary embodiment of a shifting mechanism for a transmission, whereby the tripping pins which are arranged on the indexing disk cooperate with each with one centering cone on the control levers.
Figure 2:
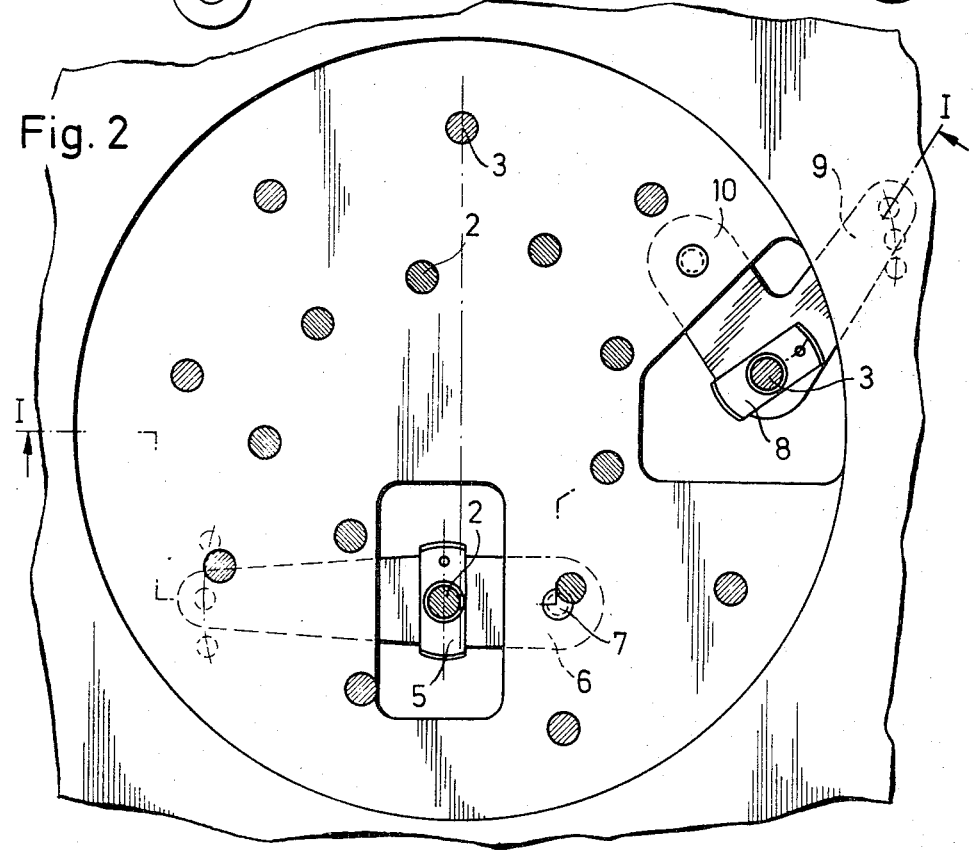
FIG. 2 is a cross-sectional view along the line II—II of a mechanism according to FIG. 1.

The mechanism illustrated in FIGS. 1 and 2 includes an indexing disk 1 which is provided with two groups of tripping pins 2 or 3. The tripping pins 2 are arranged along a shifting curve which is positioned with respect to the indexing disk axis 4 along an inner path and the tripping pins 3 are arranged on a more outwardly positioned shifting curve.

The inner tripping pins cooperate with a centering cone 5 which is arranged on a straight, one-sided control lever 6. The position of the tripping pins along the shifting curve is such that in each shifting position of the indexing disk one of the tripping pins is caught by the centering cone 5 and is centered. Therefore, the greatest radial difference in positioning of the centering cones should not materially exceed one-half of the opening width of the centering cones. Each centering cone is provided with a coaxial bore 23 which the tripping pin engages. Through this the tripping pin and the centering cone are centered exactly with respect to one another and are fixed so that even lateral forces cannot effect a shifting.

The control lever is supported pivotably about an axis 7 in the transmission housing 40. The control lever is at its free end hinged to any kind of transmission rods (not illustrated in detail) for operating the sliding gears. The control lever can assume three positions. The nine tripping pins 2 are arranged on three concentric circles which all extend within the opening width of the centering cone 5. As can also be seen from FIG. 2, only a central sector of the centering cone is provided because the shifting movement takes place only along a diameter of the cone.

The second, outer group of tripping pins 3 cooperates with a centering cone 8 which is arranged on a bell-crank shaped control lever 9. This control lever 9 operates in the same manner as the control lever 6, namely, it can also assume three shifting positions. From the three shifting positions of the two control levers 6 and 9, $3^2 = 9$ shifting combinations can be shifted. The control lever 9 is supported pivotably about an axis 10 in the transmission housing 40 and is connected through its free end to not illustrated transmission rods.

The indexing disk 1 is connected to a selector disk 12 through a shaft 11. The selector disk consists of a hand button 13 which is screwed to the shaft and with which the indexing disk can be moved against the spring 14 axially outwardly and can be rotated about its axis. The shaft 11 is surrounded by a sleeve 16 which rotates with said shaft, however, which is supported axially nonmovably in the cup-shaped lid 17. A protective sleeve 15 which telescopically engages the hand button and which is intended to prevent penetration of dirt and dust into the device is connected to the sleeve 16.

The sleeve 16 is supported rotatably in the flanged member 18 and is axially fixed by a guard ring 19. The flanged member has a number of bores 20 which number corresponds to the number of shifting positions of the selector disk. A latch pin 21 which is secured in the hand button 13 engages, in engaged position of the selector disk, the bores 20. Through this the shifting positions are determined exactly. The latch pin extends also through the protective sleeve 15 and the sleeve 16 through which these are coupled fixedly with respect to rotation with the hand button 13.

An index disk 22 is clamped between the outer edge of the protective sleeve 15 and the sleeves 16, which index disk 22 in cooperation with a marking, which is, for example, arranged on the lid 17, indicates the shifting position of the selector disk.

OPERATION

The mechanism operates as follows: The centering cones and the control levers 6 and 9 connected therewith are held in engaged condition by the tripping pins which are arranged on the indexing disk 1. The transmission is locked in a selected shifted position. If a different rotational speed is to be chosen, the hand button 13 is pulled out until the tripping pins are entirely withdrawn from the centering cones. This compresses the spring 14 which is arranged between the indexing disk 1 and the sleeve 16. In this position it is possible to freely rotate the selector disk and the indexing disk connected thereto without applying any appreciable shifting force. When the selector disk is again engaged, one tripping pin each is adjacent each centering cone. If the centering cone and tripping pin are in a position which is offset eccentrically against one another, the centering cone is then centered with respect to the tripping pin which causes the control lever and the sliding gears connected thereto to be shifted.

Figure 3:
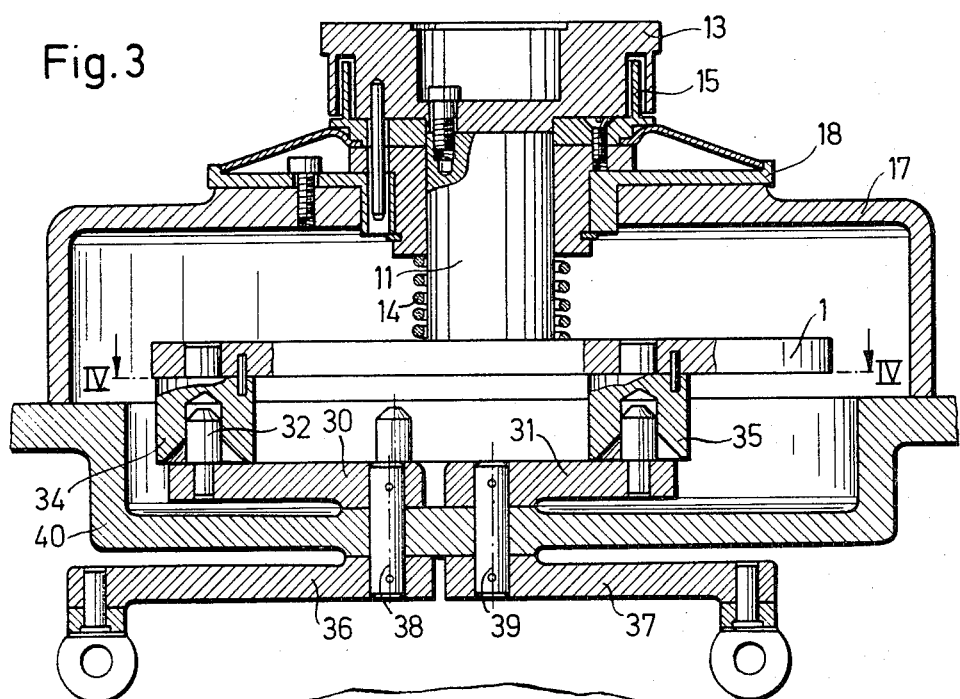
FIG. 3 is a modified exemplary embodiment illustrated in a longitudinal cross-sectional view according to FIG. 1.
Figure 4:
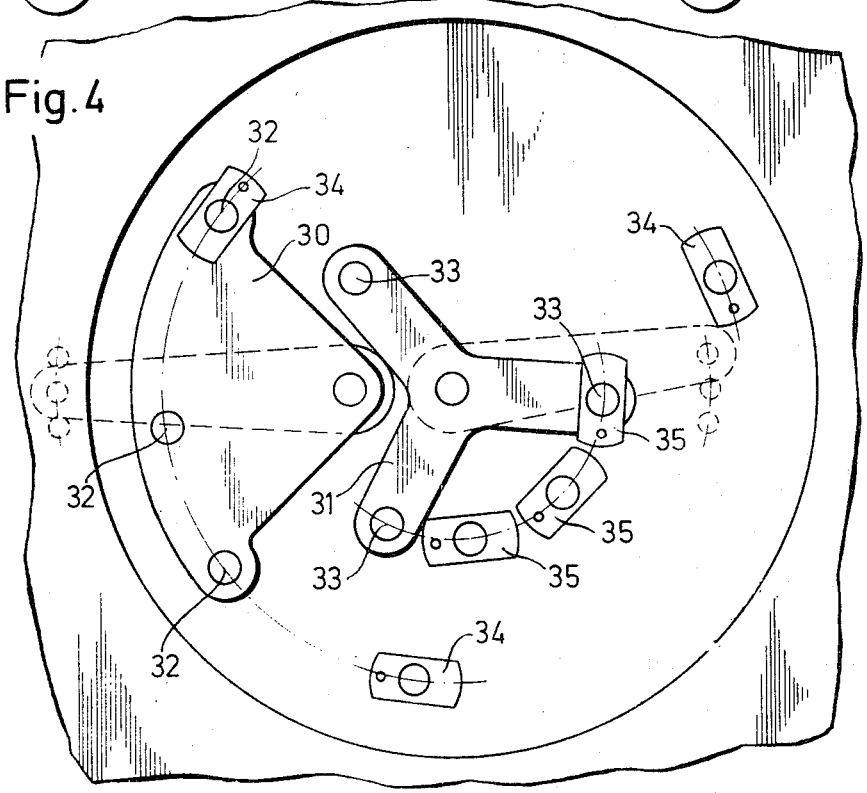
FIG. 4 is a cross-sectional view along the line IV—IV of an exemplary embodiment according to FIG. 3.

FIGS. 3 and 4 illustrate a mechanism which in principle is the same as the above-described exemplary embodiment. A difference exists only in that no longer do the nine tripping pins which are arranged on the indexing disk cooperate each with one centering cone arranged on the control lever, but instead each control lever 30 and 31 is provided with three tripping pins 32 or 33 which cooperate with three centering cones 34 or 35 of the indexing disk 1. For each control lever there exists, just as in the afore-described exemplary embodiment, nine shifting possibilities, which correspond so that each control lever can assume three shifting positions.

The control levers 30, 31 are connected to transmission rods 36, 37 through king pins which are guided through the wall 40 of the machine housing, which transmission rods lead to the sliding gears. In this exemplary embodiment the tripping pins which are connected to the control levers are centered with respect to the centering cones which are fixed in their shifting position. As can be seen in FIG. 4, the centering cones 34 and 35 are oriented in a peripheral direction so that the centering movement also takes place in peripheral direction. The distribution of the tripping pins and the centering cones and the orientation of the latter depends substantially on the available installation space and the like.

Figure 5:
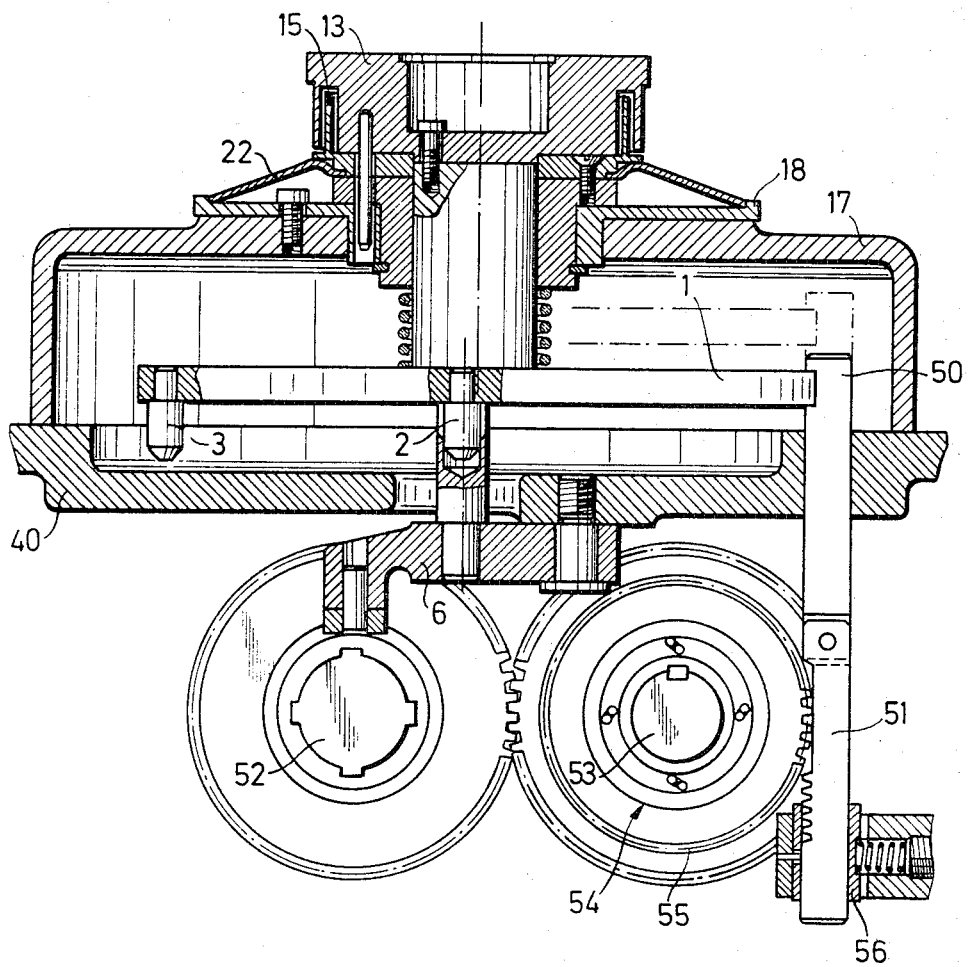
FIG. 5 is a device for starting the transmission during the shifting.

FIG. 5 illustrates on an arrangement according to FIG. 1 a device which makes the shifting easier. A connecting rod 50 is fixedly connected to the indexing disk 1. A partly toothed rack 51 is arranged pivotably on the free end of the connecting rod 50. On one of the shafts 52, 53 which carry the gears, in the present case the shaft 53, a free-wheel locking mechanism 54 is arranged which can be driven in one direction of rotation by the toothed rim 55. During engagement of the indexing disk, the shaft 53 is thereby rotated in clockwise direction so that the gears which are mounted on the shaft can be more easily coupled with the gears arranged on the other shafts. The rack 51 is designed in such a manner that in the fully engaged position the teeth no longer engage the toothed rim.

During disengagement of the indexing disk, the toothed rim can, because of the free-wheeling, be rotated without a drive transmission on the shaft 53. The rack 51 is supported at its free end in a guide 56 which can be moved transversely to the direction of movement of the rack, namely, in FIG. 5 to the right, against the force of a spring 57. In this manner the rack can move sidewardly during the disengaging movement if rack teeth abut teeth on the rim 55.

Lastly, it should be mentioned that for reasons of a better understanding in FIGS. 1 or 3, the centering cones 8 or 34 and 35 are each pivoted into the drawing plane and are illustrated in cross section.

Although a particular preferred embodiment of the invention has been disclosed above for illustrative purposes, it will be understood that variations or modifications thereof which lie within the scope of the appended claims are fully contemplated.

The embodiments of the invention in which an exclusive property or privilege is claimed are defined as follows:

1. In a mechanical switching device for a gear transmission having one or more control levers for shifting of gears and an indexing disk adapted to be moved between a coupled condition and a disengaged condition with respect to said control levers by axial movement thereof and preadjusted in said disengaged condition by a rotation thereof, a movement of said indexing disk when in said coupled condition effecting a simultaneous shifting movement of the control levers, the improvement comprising said control levers being pivotably supported in a plane extending transversely to the direction of said axial movement of said indexing disk, tripping pins are mounted on one of said control levers and said indexing disk and extending in a direction perpendicular to the plane of said indexing disk, means defining centering cones mounted on the other of said control levers and said indexing disk, the opening width of said centering cone means encompassing the entire shifting movement of the respectively associated control levers, said indexing disk having an axial zone of movement sufficient to permit said tripping pins to be adjusted from a position which is completely free of engagement with said centering cone means to a position centered on the associated centering cone means.

2. The improvement according to claim 1, wherein in association with each control lever one group of several tripping pins, which correspond to the number of shifting positions of the indexing disk, cooperate only with one of said centering cone or means.

3. The improvement according to claim 1, wherein in association with each control lever only one group each of tripping pins cooperates with only one group of centering cone means so that the product of the number of tripping pins and the number of centering cones corresponds to the number of shifting positions.

4. The improvement according to claim 1, wherein each control lever has one centering cone mounted thereon and said indexing disk has at least one group of tripping pins mounted thereon, said group of tripping pins corresponding in number to the number of control levers and wherein said tripping pins of each group are arranged along a shifting curve.

5. The improvement according to claim 1, wherein each control lever has a plurality of tripping pins thereon and said indexing disk has at least one group of said centering cone means thereon, said group of said centering cone means corresponding in number to the number of control levers, whereby the possible number of combinations of said group of tripping pins with the centering cone means of one control lever corresponds to the number of shifting positions of the indexing disk.

6. The improvement according to claim 1, wherein said centering cone means are formed by a section of a cone so that only guide surfaces formed by said sections are provided and which are required for a centering movement of said control levers.

7. The improvement according to claim 6, including means defining a bore provided on the base of the centering cones and coaxial thereto for receiving said tripping pins.

8. The improvement according to claim 1, wherein said centering cone means are constructed as separate parts which includes means for securing said centering cone means to one of said control levers and said indexing disk.

9. The improvement according to claim 8, wherein said indexing disk is connected to a manually operated selector disk for at least two of rotating, engaging and disengaging movement and being axially movable against the force of a spring for disengagement.

10. The improvement according to claim 9, wherein, in a conventional manner, a locking mechanism is provided for the possible shifting positions of the indexing disk and selector disk.

11. The improvement according to claim 1, wherein said centering cone means are constructed as separate parts including means for securing said centering cone means on one of said control levers and said indexing disk.

12. The improvement according to claim 8, wherein one of said indexing disk and said selector disk is connected through a compound lever arrangement and a free-wheel locking mechanism to at least one of said gears in such a manner that same start to rotate during the coupling movement.

* * * * *